United States Patent [19]

Bansal et al.

[11] 4,143,232
[45] Mar. 6, 1979

[54] FURNACE HAVING DIFFERENT ELECTRODE IMMERSIONS TO CONTROL CONVECTION CURRENTS, THE SHAPE, ELEVATION AND STABILITY OF THE FUSION ZONE

[75] Inventors: Bihari Bansal; Paul F. Spremulli, both of Corning, N.Y.

[73] Assignee: Corning Glass Works, Corning, N.Y.

[21] Appl. No.: 737,616

[22] Filed: Nov. 1, 1976

[51] Int. Cl.$^2$ ............................................. C03B 5/02
[52] U.S. Cl. ........................................................ 13/6
[58] Field of Search ........................................ 13/6, 23

[56] References Cited

U.S. PATENT DOCUMENTS

| | | | |
|---|---|---|---|
| 2,921,106 | 1/1960 | Arbeit | 13/6 X |
| 2,993,079 | 7/1961 | Augsburger | 13/6 |
| 3,742,111 | 6/1973 | Pieper | 13/6 |

Primary Examiner—R. N. Envall, Jr.

Attorney, Agent, or Firm—Richard E. Kurtz; Burton R. Turner

[57] ABSTRACT

A furnace for melting thermoplastic material, such as glass, includes a vertical furnace with electrodes at different levels immersed to different depths in the molten material. The convection currents and size, shape and stability of the fusion zone are controlled by changing the amount of power and the depth of immersion of the electrodes at different levels. For example, the electrodes in one of the lower tiers extend closer to the center of the furnace to produce a central upward convection current, to prevent an unstable fusion zone due to temperature gradients from wall to center, and to decrease the temperature near the furnace wall. For glasses with steep temperature-resistivity relationships and/or high infra-red absorption characteristics, the advantages of using differently immersed electrodes are even more significant.

28 Claims, 17 Drawing Figures

FURNACE HAVING DIFFERENT ELECTRODE IMMERSIONS TO CONTROL CONVECTION CURRENTS, THE SHAPE, ELEVATION AND STABILITY OF THE FUSION ZONE

BACKGROUND OF THE INVENTION

This invention relates to furnaces for melting thermoplastic material, such as glass, and more particularly to an electric furnace in which the electrodes at different levels are immersed to different depths.

In vertical electric furnaces, batch is fed over a large part of the top surface, melted and refined in upper and lower zones and removed from an outlet near the bottom. Wall electrodes and deeply immersed electrodes have been used.

U.S. Pat. No. 2,993,079 — Augsburger is an example of a shallow vertical furnace, while U.S. Pat. No. 3,524,206 — Boettner et al. is an example of a deep vertical furnace.

U.S. Pat. No. 3,583,861 — Preston is an example of a vertical furnace employing different levels of tiers of electrodes, some of which are staggered with respect to others. The aforesaid Boettner et al. furnace employs wall electrodes whereas U.S. Pat. No. 3,742,111 — Pieper employs deeply immersed electrodes. Auxilliary wall electrodes have been used with deeply immersed main electrodes to improve furnace start-up.

In all of the foregoing furnace, the size, shape and stability of the fusion zone (defined below) are critical, but electrode immersion has not heretofore been used to control the fusion zone and convection pattern.

The fusion zone may be defined as the interface between the glass batch raw materials and the molten glass where the raw materials are converted into glass and carried into the molten glass by the convection currents.

For simplicity, consider a furnace at low pull that has a relatively flat fusion zone and no hot spots on the flat top batch blanket surface. The local batch fill on this blanket would correspond to the local melting rate from the fusion zone if material moves vertically down within the blanket. The top surface is relatively cool. As one moves down into the blanket, the temperature begins to rise gradually — rising to perhaps about 200° C. in the first several inches. In this zone, the only significant change that takes place is evaporation of moisture in the raw materials. At deeper blanket layers where appropriate temperatures are reached, solid-solid chemical reactions will occur. The gases released at this elevation can rise through the porous, unreacted, raw material layers. A portion of these gases might condense if temperatures in the blanket are below their dew points but given a stable blanket, the major portion (nitrogen, carbon dioxide, etc.) escapes. The presence of gases in the blanket serves to enhance its insulating characteristics. At still deeper layers within the blanket the temperature rises rapidly by comparison. Low melting compounds begin to melt releasing even more gas that escapes through the blanket.

The sticky, glassy layer with a very large temperature gradient which exists in the last inch or two is the fusion zone. This layer contains gaseous inclusions that decrease in number and size as the molten glass is approached. Thus in a stable blanket, a variation of physical characteristics exists as the temperature increases first slowly and then rapidly. The blanket is quite fluffy and porous near the top. It then turns into sintered solid mass. A part of this solid mass turns into a semi-molten low viscosity liquid and then into a sticky viscous glassy mass. The density of the blanket increases with depth. The non-condensable gases can escape freely through the porous blanket but only with difficulty and perhaps only partially through the molten glassy phase. This gradual change in batch blanket is extremely important in determining the residual gaseous inclusions.

For example, when a hot spot occurs in the blanket, this gradual progression is destroyed for all practical purposes. If one continues to fill over the hot spots, the evolved gases will find it difficult to escape. The hot spots will act as a virtual trap for the gas. The stable cold blanket, by contrast, allows the orderly escape of gases through it.

A similar but somewhat less obvious situation exists for the dissolution of sand grains. At elevations in the blanket where temperatures are correct, the fluxes are melted into a low viscosity liquid. It is the chemical reaction between this liquid and sand grains that produces alkali silicates. It is extremely important that liquid fluxes are given sufficient time to react with sand grains resulting in the first formation of glass. If this chemical environment is not maintained, the dissolution of sand grains by alkalies will be slowed resulting in poor quality glass leaving the batch blanket thus increasing the workload on the bath. A stable blanket "naturally" provides the time necessary for silica grain dissolution. This is because in the stable blanket, the sticky, viscous, glassy layer prevents the low viscosity molten fluxes from "running" and depleting the environment of the chemicals necessary for grain dissolution. This phenomenon has been called overmelting and also occurs in gas fired furnaces when the temperatures are extremely high. Thus, the stability of batch blanket is crucial in preventing the gaseous inclusions and unmelted silica in the glass from leaving the fusion zone.

The fusion zone at the center of the furnace sinks lower into the furnace as the pull is increased. This reduces the residence time of glass sheared off from the lower section of the fusion zone, resulting in decreased melting capacity or impaired quality of glass produced. Also, as pull is increased, the power input to the furnace must be increased, resulting in higher power concentration around the electrodes. This causes higher temperature near the walls and the electrodes, resulting in higher heat losses, shorter furnace life, increased electrode wear and instability of the fusion zone further adversely affecting glass residence time and quality.

The instability of the fusion zone is related to the resistivity/temperature relationship for the glass. The molten glass acts as an ohmic resistance that decreases as the temperature is increased. For a fixed applied voltage across the circuit, the power generated increases as resistance is decreased, i.e., when temperature is increased. When a temperature gradient exists from the walls to the center of the furnace near the elevation of the fusion zone, the local power dissipated is not uniform from wall to center. The higher the temperature in a local zone, the more highly disproportionate its share of power will be. This causes the local temperature to rise further which in turn decreases local resistance thereby increasing local power dissipation further. A potentially unstable situation exists. This causes local hot spots on the blanket top and may cuase severe instability and even total melting of batch blanket for a glass with a steep resistivity-temperature relationship. Likewise, a high infra-red absorption glass will cause a fusion zone instability by increasing the temperature differences between furnace center and wall due to reduced radiation heat transfer. The instability tendency increases as pull is increased.

In addition to their effect on the stability of the fusion zone, convection currents strongly affect the quality of glass. With equal immersion of electrodes at all levels, a good control of either wall or furnace central convection currents is obtained. However, a simultaneous control of the wall and center convection currents is not possible even with staggered electrodes of equal immersion.

In an electric furnace, physical differences such as electrode immersion, electrode tier arrangement, power distribution and batch fill pattern have a major influence on such things as fusion zone shape and stability, convection current patterns and temperature distribution. These are in turn related to economic benefits such as furnace capacity, furnace and electrode life and glass quality.

The stability of the blanket and the fusion zone are particularly important in determining the glass quality and the furnace capacity and therefore a method of obtaining more uniform temperatures across the fusion zone, of keeping the fusion zone high in the unit and of simultaneously controlling wall and center convection currents in the furnace would achieve the objectives of superior glass quality and greater furnace capacity.

SUMMARY OF THE INVENTION

In accordance with this invention, the shape, the elevation and the stability of the fusion zone in an electric furnace are controlled by varying the immersion depth and the elevation of the electrodes at one or more levels and the amount of power introduced at various levels.

In accordance with an important object of this invention, independent control of the wall and the center fusion zone is provided. Also, independent control of the wall and the furnace center temperatures is provided.

In accordance with another object of this invention, operation of an electric furnace with relatively cold edges and a higher center fusion zone is possible.

In accordance with another object of the invention, it is possible to simultaneously control wall current and furnace center convection currents.

In accordance with another object of the invention, the furnace walls are maintained at a cooler temperature at high pulls.

In accordance with another object of the invention, operation of an electric furnace with a more stable fusion zone is made possible.

In accordance with another object of the invention, it is possible to reduce the power applied to the upper electrodes while maintaining a constant high temperature. Consequently, current concentration on the upper electrodes is reduced, thereby increasing the life of these electrodes. Also, the velocity of convection currents at the furnace wall is reduced, thereby increasing the life of the wall.

In accordance with another object of the invention, the stability of the upper furnace temperature is improved.

In accordance with another object of the invention, the fusion zone at the wall is maintained sufficiently high above the electrodes and a decreased power ratio between the upper and the lower electrodes is obtained.

It is a further object of the present invention to increase the residence time of glass in the upper part of the furnace to insure better melting and fining.

Another object of this invention, in addition to the usual vertical control attained through multiple electrode levels is to provide radial center-to-wall temperature control by different immersions.

The foregoing and other objects, features and advantages of the invention will be better understood from the following more detailed description and appended claims.

DESCRIPTION OF SPECIFIC EMBODIMENTS

Figure 1:
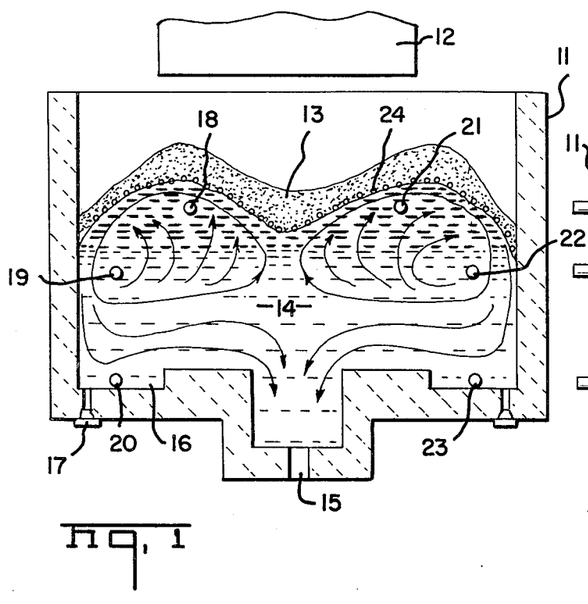
FIG. 1 shows the invention applied to a furnace of rectangular cross-section.
Figure 2:
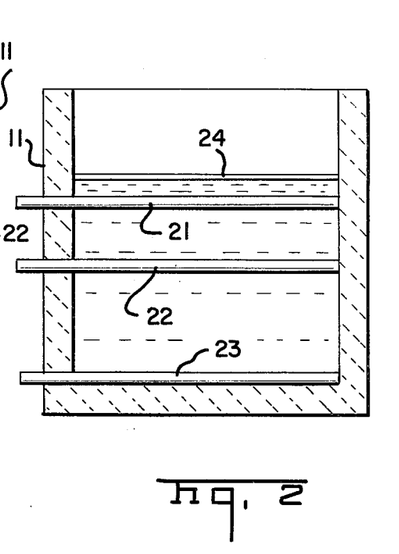
FIG. 2 shows a side cross-sectional view of the furnace of FIG. 1.

Referring to FIGS. 1 and 2, the furnace comprises a vertical tank 11 formed of conventional refractory material. Batch is fed into the furnace through the top by batch feeder 12. The batch forms a blanket 13 which may completely cover molten glass 14. The batch is continuously fed into the furnace and molten glass is continuously withdrawn through outlet 15 in the bottom of the furnace. A depression 16 around the periphery of the bottom of the furnace forms a sump for the collection of eroded refractory material and contaminated glass which can be removed through the drains 17 in the bottom of the furnace. In a rectangular furnace such as this, electrodes 18-23 extend completely across the width of the furnace.

A fusion zone 24 extends between the bottom surface of blanket 13 and the molten glass 14. In accordance with this invention, electrodes 18 and 21 are located closer to the center of the furnace than are other electrodes. This raises the center of the fusion zone to keep it flatter and more stable and increases the residence time in the upper zone of the furnace.

Figure 3:
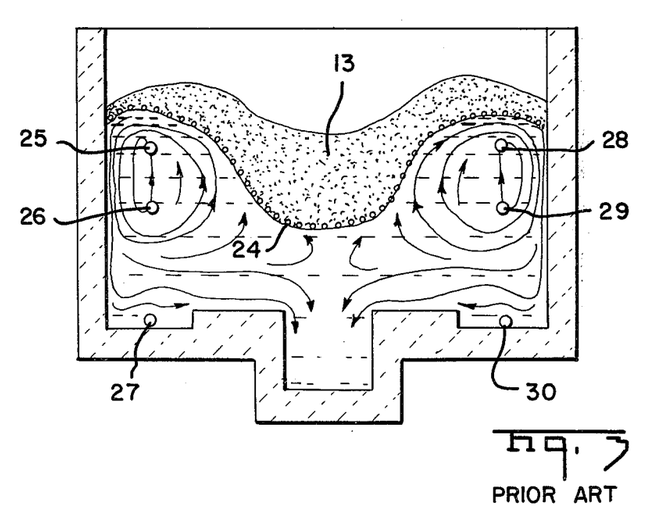
FIGS. 3 and 4 depict the shape of the fusion zone in rectangular furnaces.
Figure 4:
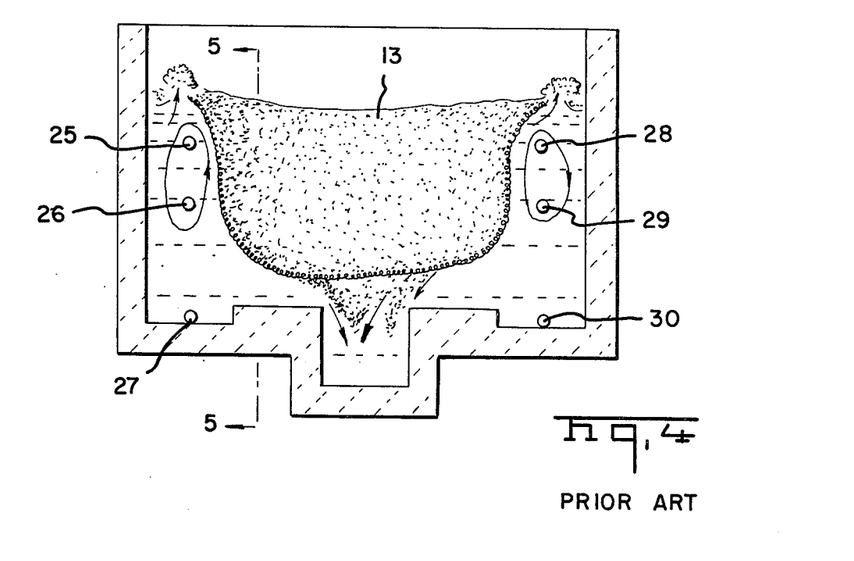
Figure 5:
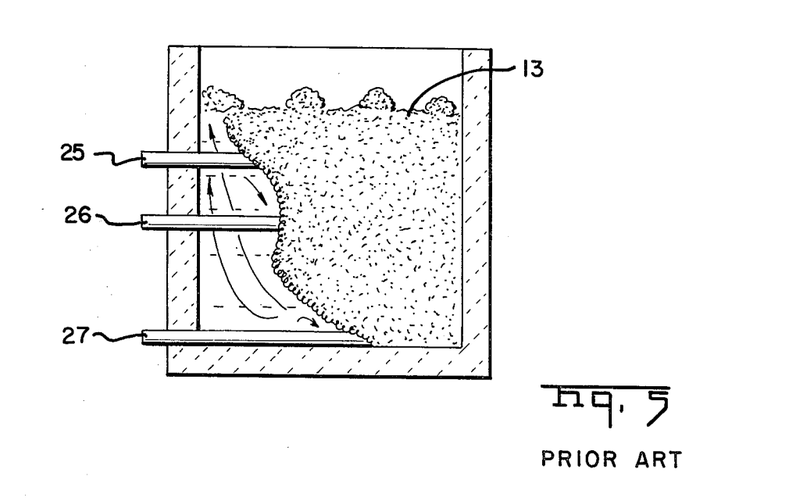
FIG. 5 is a section on the line 5—5 of FIG. 4.

This can be better understood with reference to FIGS. 3-5 which show a similar rectangular furnace with electrodes 25-30 with conventional spacing.

First, consider a lightly loaded furnace, that is one operated at low pull rates. The fusion zone extends substantially uniformly across the entire unit. The center fusion zone is high and at the elevation of the upper main electrodes 25 and 28. The fusion zone is usually a few inches thick with a very large temperature gradient. As melted glass leaves the bottom of the fusion zone, it enters into the molten streams. At regions where there are concentrations of electric power close to the electrode surfaces, there are rising convection currents. This causes the fusion zone near the electrodes to be higher and to have a faster melting rate than elsewhere. As the flow leaves this region, it is cooled slightly.

Because the electrodes in the upper tiers are in line, the convection currents produced by them are additive in a narrow region. The currents produce good mixing near the electrodes, but cause electrode and wall wear.

As pull is increased, the power to the electrodes is increased. As shown in FIG. 3, the batch blanket 13 thins down over the electrodes and thickens elsewhere. The center fusion zone sinks and residence time in the upper zone decreases. When the center fusion zone reaches the lowest tier of main electrodes 26 and 29, the unit is considered to be at its normal capacity. If the flow rate is increased still further, the center fusion zone will sink more. As shown in FIG. 4 the unmelted and unfined glass from the very low fusion zone short circuits the tank. Flow may even become asymmetric across the width (FIG. 5). Molten glass boils up through the thin batch pressed over the top of the electrodes. The maximum capacity of the furnace has been exceeded.

However, in accordance with the subject invention, as shown in FIG. 1, the hot pockets around the electrodes are broadened and cooled by using the different immersions of the electrodes (toward the center) in the tier including electrodes 19 and 22 as contrasted with the tier including electrodes 18 and 21. With this arrangement, the convection currents produced by the electrodes are not additive. Mixing is less intense but covers a larger volume and refractory corrosion is reduced. The speed of the convection currents at the end walls is decreased with a decrease in shear stress and temperature so that refractory and electrode corrosion is reduced. Since one tier of electrodes is closer to the center fusion zone, power can be distributed to control the height of the center fusion zone. Thus, we control the furnace top-to-bottom and side-to-side and increase the residence time of the molten glass in the upper zone.

Figure 6:
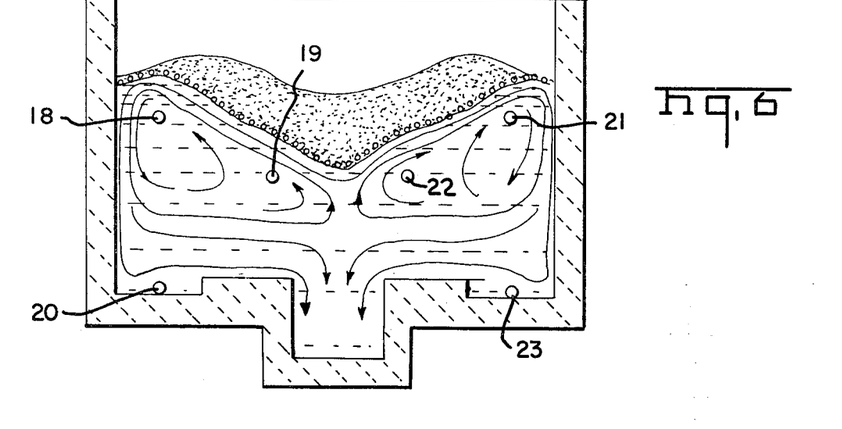
FIG. 6 shows a modification of the furnace of FIG. 1.

FIG. 6 shows a modification in which the electrodes 19 and 22 are more deeply immersed toward the center of the furnace. In this case, there will be an upward convection roll at the center fusion zone at all conditions. This provides positive control on how low the center fusion zone will sink in the unit. The control of the side wall fusion zone is not as good as for the arrangement of FIG. 1. Top-to-bottom and side-to-side control is also realized with this arrangement.

Figure 7:
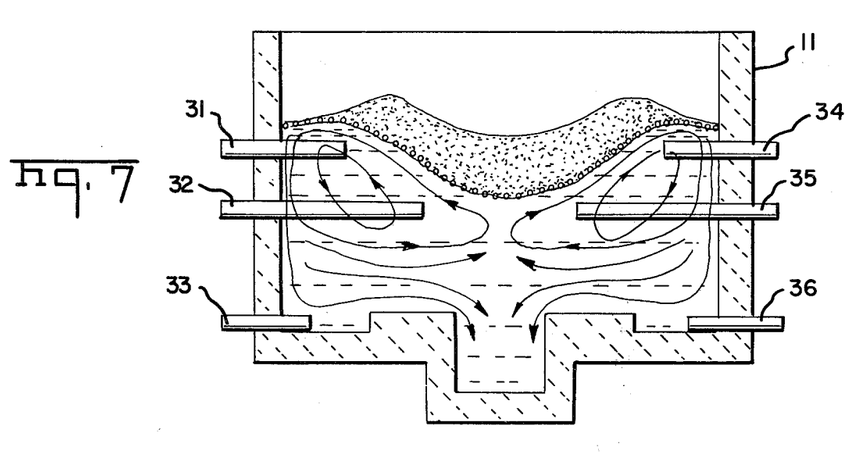
FIG. 7 depicts the invention applied to a furnace of rectangular cross-section with electrodes extending through the side wall toward the center.

FIG. 7 shows the invention applied to a rectangular furnace with banks of electrodes 31-36 immersed through the end walls but which do not extend across the width of the furnace. The furnace behaves very much like the furnace previously described. In order to provide positive control of the center fusion zone, the second tier, including electrodes 32 and 35, is more deeply immersed. More and smaller recirculation zones are produced depending upon fill, power distribution and depth of immersion. The two independent modes of control also hold.

Figure 8:
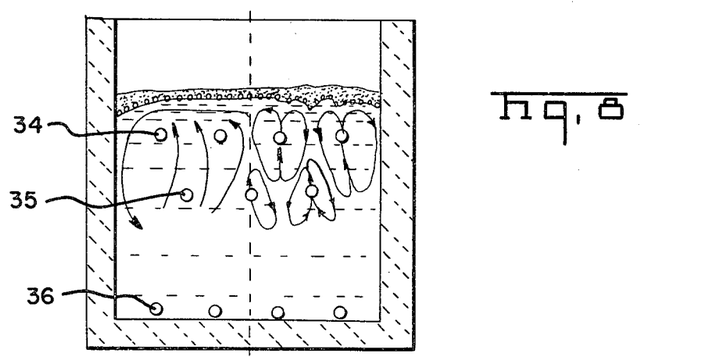
FIG. 8 is a side cross-sectional view of the furnace of FIG. 7 depicting two possible flow patterns near the electrode walls.

FIG. 8 shows two possible flow patterns for the furnace of FIG. 7 at the electrode walls.

Figure 9:
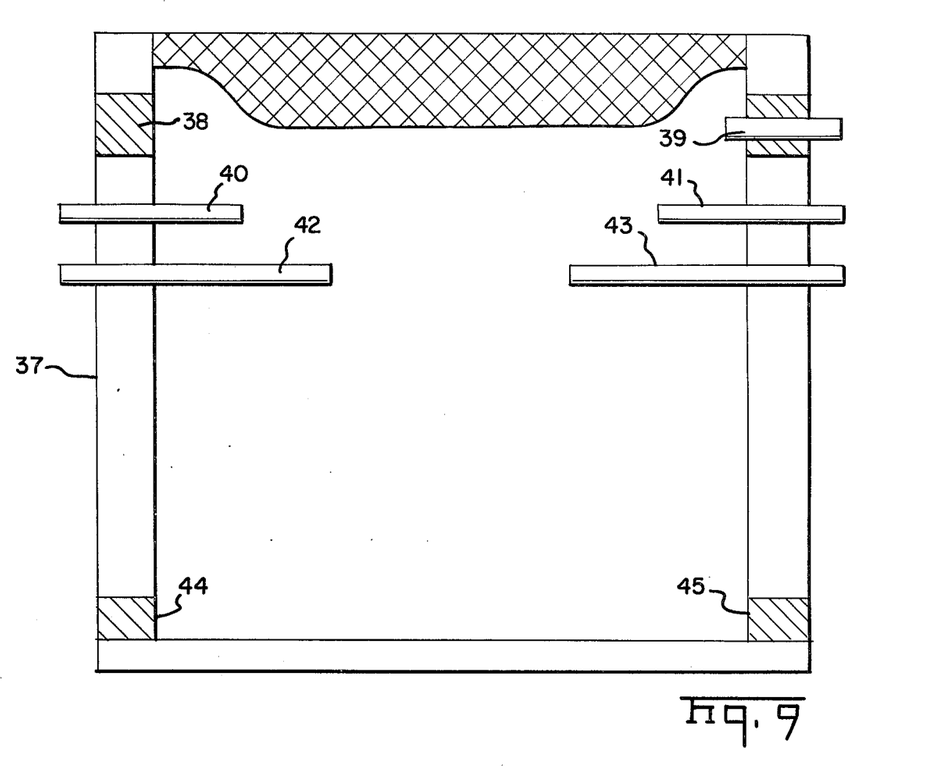
FIG. 9 shows two possible embodiments of the invention applied to a furnace of generally cylindrical cross-section.

FIG. 9 shows two possible applications of the invention to a substantially cylindrical tank 37. The furnace has four tiers of electrodes. The immersion incresases for the first three tiers, and decreases for the fourth tier. Upper main electrodes 38 and 39 in the first tier are either wall or immersed electrodes. Middle main electrodes 40-41 and lower main electrodes 42-43 are deeply immersed rod electrodes and electrodes 44 and 45 are wall electrodes. In a typical ten foot diameter furnace, electrodes 40 and 41 are immersed 1-2 feet and electrodes 42 and 43 are immersed 2-4 feet or more. Each tier may include a different number of electrodes. FIG. 9 shows the electrodes installed perpendicular to the walls but this is not necessary.

At low pulls, a sufficient portion of the power is added at the tier including upper main electrodes 38 and 39 to insure no downward wall current carrying unmelted unfined glass to the outlet. The tiers of electrodes including 40-43 carry most of the remainder of the power. Depending on the location of these tiers in the furnace, at low pulls when the fusion zone is high and flat, it will not be necessary to add more power to electrodes in these tiers for a small pull increase unless an overall temperature increase is desired. As pull is increased, the fusion zone deepens in the center getting closer to the electrodes 40-43. Now the additional power required by the pull increase is added to the electrodes in these deeply immersed tiers. This causes the temperature to increase in the center of the furnace, increases the residence time and increases the melting at the deepening central fusion zone. The increased power developed in the furnace center minimizes the temperature difference from wall to center, and insures greater stability of the fusion zone.

To insure keeping power to electrodes 38 and 39 the same or only slightly greater, the extra fill may be added toward the center and not along the edges of the batch blanket.

The use of electrodes immersed to different depths has the advantage of controlling convection currents. At one extreme, if all of the electrodes are wall electrodes, the strong downward wall currents can be minimized and only vertical temperature control can be used. At the other extreme, if all of the electrodes are deeply immersed, the downward current from the furnace center can be controlled. However, only with differing electrode immersions can both types of convection currents be controlled independently and to the best advantage so that both top-to-bottom and center-to-side temperatures can be controlled independently.

As power is reduced on electrodes in the tier including electrodes 38 and 39, and added to the other tiers, the temperature near the wall decreases reducing the heat loss through the wall, prolonging furnace life and reducing cost of necessary electric energy.

From an immersed electrode, there is an upward convection current in the vicinity of the tip which rises and then turns around and becomes a downward current at the walls, and between the adjacent circumferentially disposed electrodes and at the center of the furnace. Thus, even if the electrodes are staggered the counter circulation can only be partially effective at the walls and completely ineffective beyond the immersion depth of the electrodes radially towards the center of the furnace. In fact, they are additive there. In the present invention, the deeper immersed electrodes behave in a similar fashion except that the radially inwardly moving currents from these electrodes melt out hollows in the fusion zone and simultaneously partially counteract the inwardly moving currents from the shallower immersed electrodes which also melt out hollows in the fusion zone in the vicinity of their upward currents. Thus, the "counter circulation" differs significantly from that caused in the aforementioned Preston or Pieper patents.

Figure 10:
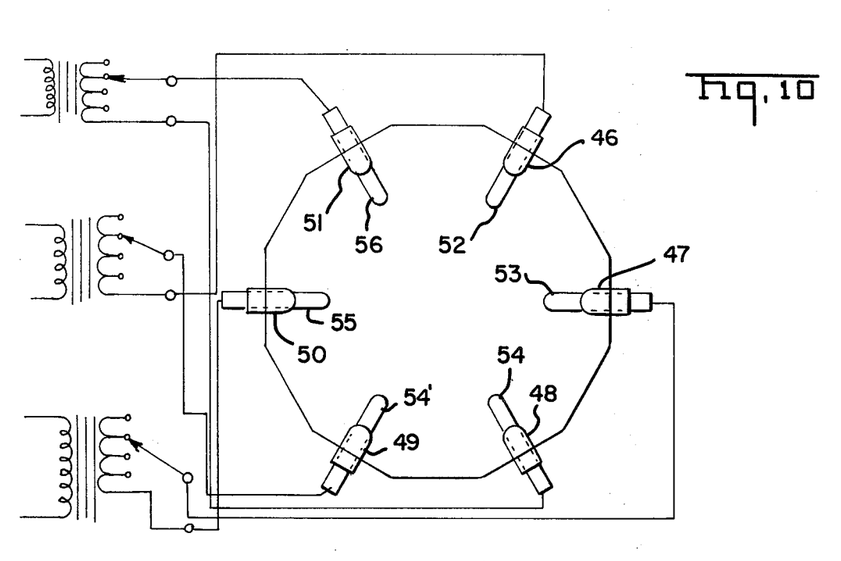
FIG. 10 is a top view of a generally cylindrical furnace with two sets of electrodes.

FIG. 10 shows a top view of a substantially cylindrical furnace having three tiers of main electrodes but with the upper main wall or immersed electrodes not shown. The immersed middle main tier is 46-51 with the immersed lower main tier being electrodes 52-56. Three phase power is applied to these electrodes by conventional means. It has been found that when the power ratio between the middle main 46-51 and the deeply immersed lower main 52-56 tier is in the range of 0.7 to 1.5, and the ratio between the upper main and the other two tiers is in the range of 0.6 to 1, the capacity of the furnace is substantially increased at constant controlled temperature, good stability and good quality glass. Therefore, it can be seen that the use of deeply immersed electrodes allows a decrease of the power on the upper main electrodes. This is explained as follows.

With deeply immersed electrodes, power is shifted from upper electrodes and added to the deeply immersed electrodes. This decreases the temperature near walls and increases temperature in the furnace center. To compensate the batch fill is shifted from the edges to the center thus preventing the fusion zone near the walls from sinking over the electrodes. The power ratio is therefore lowered without a decrease in the pull and the wall fusion zone remains at a safe level.

It is also possible to increase pull by applying the additional required power at the deeper immersed electrodes and adding the additional fill at or near the center of the furnace.

In FIG. 10 the same phase of power is applied to the oppositely disposed electrodes. The same power may be applied to all electrodes in the same tier but different tiers may have different power applied thereto. Thus, each tier has its own equal intra-phase power. Similarly located electrodes in different tiers have equal inter-phase power. In the same tier, electrodes with the same spacing have the same inter-phase power.

Figure 11:
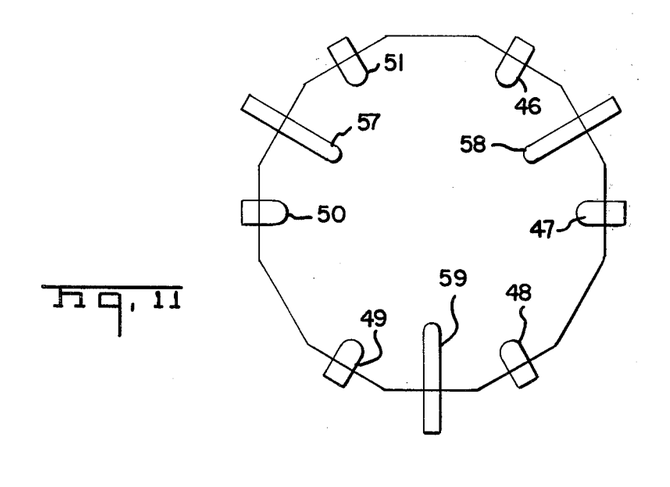
FIG. 11 shows a modification of the furnace of FIG. 10.

FIG. 11 shows a modification with six electrodes 46-51 in the upper main tier. The deeply immersed lower tier has three electrodes 57-59 placed symmetrically but offset equally from adjacent electrodes in the upper tier. Alternatively, six equally spaced deeply immersed electrodes can be employed in the lower tier. The two sets could be at a single elevation but it is preferred to use the deeply immersed set at a somewhat lower elevation than the upper main electrodes. With six shallow immersed electrodes and six deeply immersed electrodes in a lower tier, there is complete symmetry, both geometrically and electrically. There is inter-phase firing between adjacent electrodes as well as intra-phase firing in each set of electrodes. This allows controlling the fusion zone over the entire furnace. This is radial control independent of vertical temperature control.

Different phase power may be applied to electrodes 57, 58 and 59. The inter-phase powers between each of these three electrodes are equal. The shallow immersed electrodes 47-51 are on a polyphase system such that the voltage between adjacent electrodes such as 47-48 or 48-49 are equal. Also, the voltage between oppositely disposed electrodes such as 47-50 or 48-51 are equal. The inter-phase voltage between similarly located electrodes in different tiers, such as 49-59 or 59-48, are equal (unless relative phases are shifted by some control means).

Figure 12:
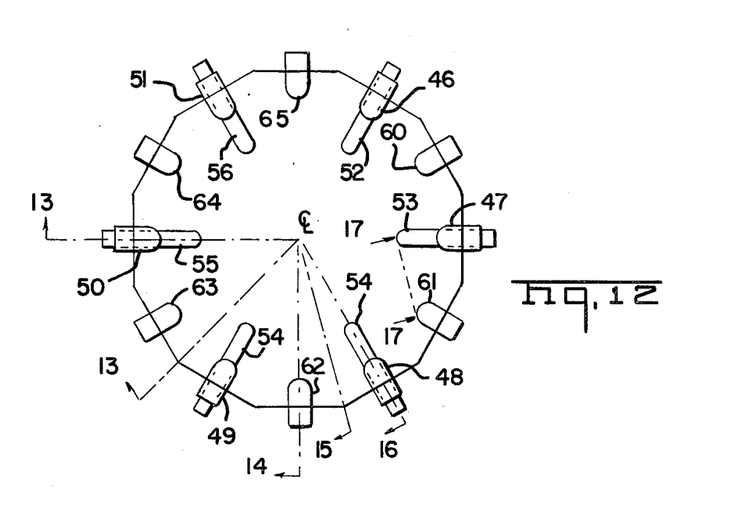
FIG. 12 shows a generally cylindrical furnace with three tiers of electrodes.

To insure the best control of the wall fusion zone and downward wall currents, a third set of shallowly immersed electrodes 60-65 is provided as shown in FIG. 12. Electrodes can be in line with the electrodes of the other two tiers, or they can be staggered with respect to them as shown in FIG. 12.

Figure 13:
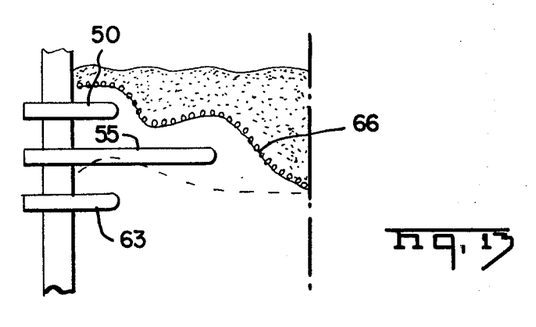
FIG. 13 shows a partial combined section on the line 13- $\ell$ (center line) of FIG. 12.

FIG. 13 shows a combined view on the lines 13- $\mathcal{L}$ of FIG. 12. FIG. 13 shows how the fusion zone 66 is hollowed out by the rising glass currents above the ends of the electrodess Since some of the electrodes are offset, some of the hollowed out sections are also offset.

Figure 14:
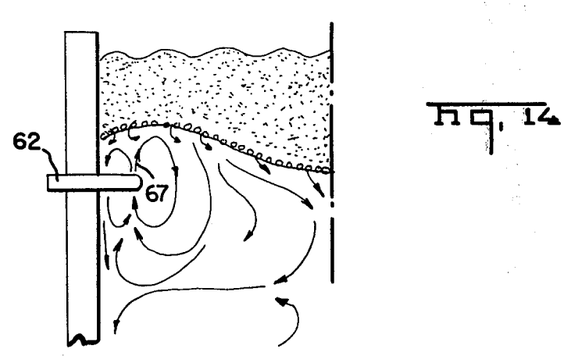
FIG. 14 is a section on the line 14- $\ell$ of FIG. 12.

FIG. 14 shows a view on the line 14- $\mathcal{L}$ of FIG. 12. The wall fusion zone is lower at the tier electrodes which includes electrode 62 than at the other tiers. The shape and elevation of the fusion zone is controlled by the convection current 67 rising from this electrode and interacting with the currents originating from the fusion zone and adjacent electrodes. The convection currents under the fusion zone and the flow currents are all down as shown. The wall fusion zone is lower here compared to a wall having in-line power electrodes.

Figure 15:
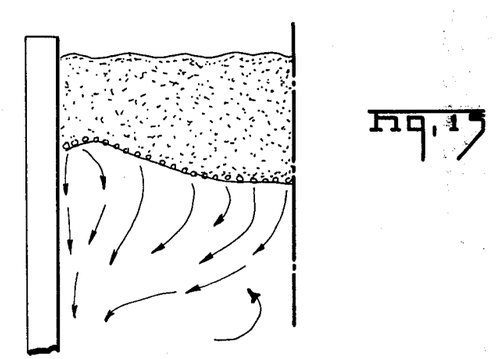
FIG. 15 is a view on the line 15- $\ell$ of FIG. 12.

FIG. 15 shows the convection and flow currents in section along the line 15- $\mathcal{L}$. The fusion zone elevation is lower here than elsewhere as no electrodes are in this plane and all glass currents in the upper part of the furnace are additive and downward.

Figure 16:
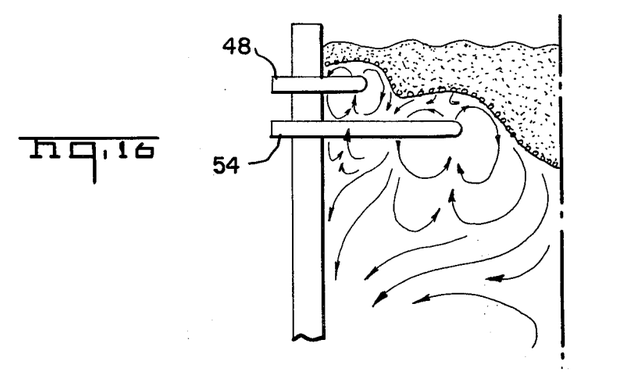
FIG. 16 is a view on the line 16- $\ell$ of FIG. 12.

FIG. 16 is a view on the line 16- $\mathcal{L}$ of FIG. 12, and shows the convection and flow currents in this plane. The wall fusion zone is at the highest elevation above electrode 48. The gouging out of the blanket above these electrodes is the greatest, and these electrodes have a major impact on the shape of the blanket and the elevation, shape and stability of the fusion zone. These electrodes do not cause radial counter-circulation, but the flow pattern in this plane spreads out radially as shown and increases the number of hot zones.

Figure 17:
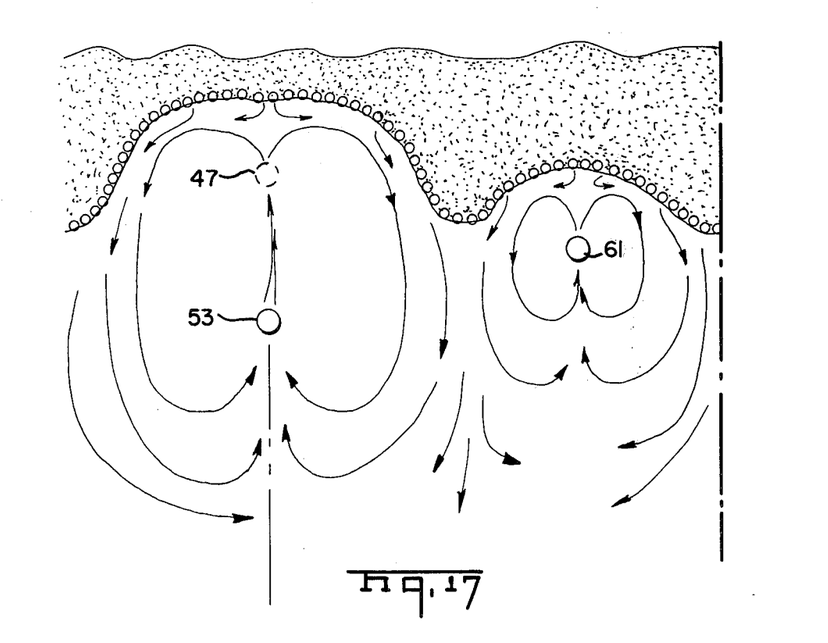
FIG. 17 is a view on the line 17—17 of FIG. 12.

FIG. 17 is a view on the line 17—17 of FIG. 12. It shows the flow from the fusion zone at an exaggerated scale, so that flow can be shown clearly. Note how the fusion zone, and the blanket shape are altered by the electrodes.

Here again it is to be noted that the convection currents from the electrodes do not counteract with one another. Instead, they gouge out their own zones for melting.

When the glass composition is changed in the furnace, it may be found that previous electrode immersions are not optimum. In this case, the relative immersions may be changed to suit the new glass. For example, as the temperature-resistivity or the infra-red absorption characteristics are changed, different immersions may be required.

While particular embodiments of the invention have been shown and described, various modifications are within the true spirit and scope of the invention. The appended claims are, therefore, intended to cover all such modifications.

What is claimed is:

1. Apparatus for the melting of thermoplastic material comprising:

a vertical furnace, batch feeder means for supplying batch to an upper part of said furnace, outlet means formed in the bottom of said furnace for withdrawing molten material from said lower part of said furnace subsequent to the refinement thereof, and a plurality of electrodes arranged in at least two groups with the immersion of the electrodes in each group being the same, the electrodes of at least one group having a longer length than the other group so that they extend closer to the center of said furnace than electrodes in said other group, the positions of the electrodes being symmetrical within each group and symmetrical between the groups, the length of said electrodes being selected to control the size and shape of the fusion zone between said batch and said molten material.

2. The furnace recited in claim 1 wherein said furnace is substantially cylindrical and wherein said electrodes are arranged in tiers of electrodes around the periphery of said furnace.

3. The furnace recited in claim 2 wherein the deeply immersed electrodes are staggered with respect to the electrodes in another tier.

4. The furnace recited in claim 2 wherein polyphase electrical power is applied to the electrodes.

5. The furnace recited in claim 4 wherein said polyphase electric power is applied so that the inter-phase voltages between the differently immersed adjacent electrodes are equal.

6. The furnace recited in claim 4 wherein said polyphase electric power is applied between oppositely disposed electrodes.

7. The furnace recited in claim 4 wherein polyphase electric power is applied between electrodes having one immersion depth and differently phased electric power is applied between electrodes of another immersion depth.

8. The furnace recited in claim 1 wherein the cross-section of said furnace is polygonal with electrodes disposed on the sides of said polygon, polyphase electrical power being applied to said electrodes.

9. Apparatus for the melting of thermoplastic material comprising:

a vertical furnace having a rectangular cross section, batch feeder means for supplying batch to an upper part of said furnace, outlet means formed in the bottom of said furnace for withdrawing molten material from said lower part of said furnace subsequent to the refinement thereof, and a plurality of electrodes arranged in tiers with at least two electrodes in each tier, said electrodes extending parallel to the center line of said furnace, the electrodes in at least one tier being closer to the center line of said furnace than the electrodes in another tier, the position of the electrodes with respect to the center line of said furnace being selected to control the size and shape of the fusion zone between said batch and said molten material.

10. The furnace recited in claim 9 wherein said electrodes extend across the width of said furnace and are located at different positions along the length of said furnace with respect to the furnace center.

11. The furnace recited in claim 9 wherein the electrodes in one of the lower tiers are closer to the center of the furnace than other electrodes to produce an upward convection current near the center of said furnace.

12. The furnace recited in claim 9 wherein said electrodes extend from the sides of the furnace, the electrodes in some tiers extending closer to the center of the furnace than electrodes in other tiers so that convection currents travel in different paths through said fusion zone.

13. An improved method of melting and refining thermoplastic material by controlling the fusion zone between the batch and the melt said method comprising:

introducing batch of said material into an upper portion of a furnace, applying electrical energy to a plurality of electrodes immersed in molten thermoplastic material in said furnace, controlling the shape and depth of the fusion zone between said molten material and said batch by providing electrodes which have different lengths in said molten material, and withdrawing molten thermoplastic material from the bottom of said furnace.

14. The method recited in claim 13 wherein the immersion of said electrodes in said molten material is selected to simultaneously control the velocities and locations of the wall and the furnace center convection currents.

15. The method recited in claim 13 wherein the stability of the fusion zone is controlled by using differing electrode immersions.

16. The method recited in claim 13 further comprising:

selecting different immersion depths of said electrodes in said molten material when the composition of said thermoplastic material is changed in the furnace.

17. The method recited in claim 16 wherein different immersion depths are selected when the resistivity/temperature characteristic of the molten material changes.

18. The method recited in claim 16 wherein different immersion depths are selected when the infrared absorption characteristics of the molten material changes.

19. The method recited in claim 17 wherein the fill pattern is changed to permit changing the power distribution between the differently immersed electrodes.

20. An improved method of melting and refining thermoplastic material by controlling the fusion zone between the batch and the melt, said method comprising the steps of:

introducing batch of said material into an upper portion of a furnace, applying electrical energy to a plurality of electrodes having different lengths immersed in molten thermoplastic material in said furnace, changing the fill pattern to control the height of molten material at the wall above the upper tier of electrodes whereby the temperature of this portion of the furnace wall is lowered, and withdrawing molten thermoplastic material from the bottom of said furnace.

21. The method recited in claim 20 further comprising:

applying increased power to the more deeply immersed electrodes whereby the capacity of the furnace is increased.

22. An improved method of melting and refining thermoplastic material by controlling the fusion zone between the batch and the melt, said method comprising the steps of:
- introducing batch of said material into an upper portion of a furnace,
- applying electrical energy to a plurality of electrodes immersed in molten thermoplastic material in said furnace,
- controlling the radial temperature distribution in said furnace by providing electrodes which have different immersion lengths in said molten material, and
- withdrawing molten thermoplastic material from the bottom of said furnace.

23. An improved method of melting and refining thermoplastic material by controlling the fusion zone between the batch and the melt, said method comprising the steps of:
- introducing batch of said material into an upper portion of a furnace,
- applying electrical energy to a plurality of differently immersed electrodes which extend orthogonally from a wall of said furnace in molten thermoplastic material,
- selecting the power distribution applied to the differently immersed electrodes to control the radial temperature distribution in said furnace, and
- withdrawing molten thermoplastic material from the bottom of said furnace.

24. The method recited in claim 23 further comprising:
- simultaneously controlling the vertical temperature distribution in said furnace.

25. An improved method of melting and refining thermoplastic material by controlling the fusion zone between the batch and the melt, said method comprising the steps of:
- introducing batch of said material into an upper portion of a furnace,
- applying electrical energy to a plurality of differently immersed electrodes extending orthogonally from a wall of said furnace in molten thermoplastic material in said furnace,
- controlling the residence time in the upper part of the furnace by selecting the immersion depths of said electrodes in said molten material, and
- withdrawing molten thermoplastic material from the bottom of said furnace.

26. An improved method of melting and refining thermoplastic material by controlling the fusion zone between the batch and the melt, said method comprising the steps of:
- introducing batch of said material into an upper portion of a furnace,
- applying electrical energy to a plurality of electrodes which extend orthogonally from a wall of said furnace and which are immersed in molten thermoplastic material in said furnace,
- controlling the shape and depth of the fusion zone between said molten material and said batch by selecting the immersion lengths of said electrodes, and
- withdrawing molten thermoplastic material from the bottom of said furnace.

27. An improved method of melting and refining thermoplastic material by controlling the fusion zone between the batch and the melt, said method comprising the steps of:
- introducing batch of said material into an upper portion of a furnace,
- applying electrical energy to a plurality of electrodes which extend orthogonally from a wall of said furnace and which are immersed in molten thermoplastic material in said furnace, and
- controlling the shape and depth of the fusion zone between said molten material and said batch by applying more power to the electrodes in one tier than in the other tier to control the shape and depth of the fusion zone.

28. The method recited in claim 27 wherein said power distribution is selected to control the center to side temperature distribution independent of vertical temperature distribution.

* * * * *